A. BIPPART.
FLOWER HOLDER FOR THE DRESS.
APPLICATION FILED APR. 5, 1913.
1,072,903.
Patented Sept. 9, 1913.
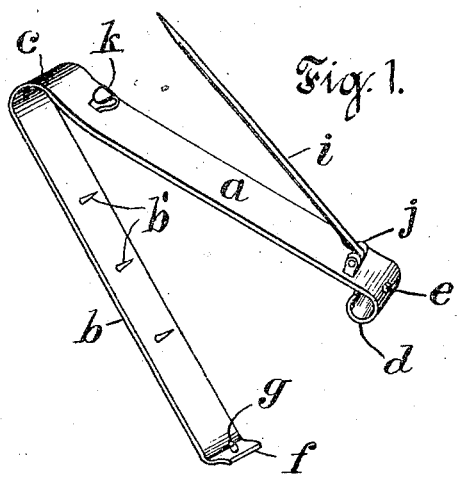
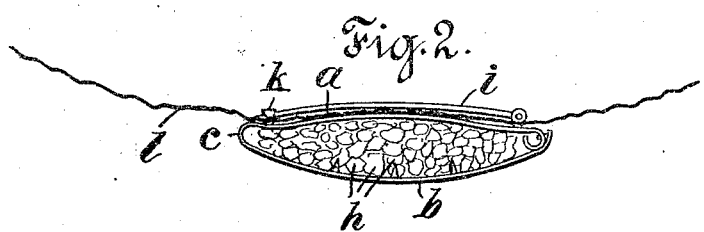

UNITED STATES PATENT OFFICE.

ACHILL BIPPART, OF NEWARK, NEW JERSEY.

FLOWER-HOLDER FOR THE DRESS.

1,072,903.

Specification of Letters Patent. Patented Sept. 9, 1913.

Application filed April 5, 1913. Serial No. 759,072.

*To all whom it may concern:*

Be it known that I, ACHILL BIPPART, a citizen of the United States, residing at 788 South Tenth street, Newark, county of Essex, and State of New Jersey, have invented certain new and useful Improvements in Flower-Holders for the Dress, fully described and represented in the following specification and the accompanying drawings, forming a part of the same.

The object of the present invention is to furnish a device which will grasp a bunch of flowers and hold them securely, and also provided with a hinged pin by which it may be attached to the dress to hold the flowers thereon.

The invention consists of two elastic leaves made in one piece with a loop at one end, means for detachably connecting the free ends of the leaves and means for attaching the holder to the dress of the wearer. By this construction, the holder for the flowers is expansible, so as to hold and retain a greater or less quantity of flower-stalks.

The invention will be understood by reference to the annexed drawing, in which—

Figure 1 is a perspective view of the device; and Fig. 2 is a plan of the same with flower-stalks in section in the holder and the pin engaged with a fabric, as the dress of a lady.

The holder consists of two elastic leaves, made in one piece, united by a loop at one end and having a fastening device at the opposite end, and adapted to open for inserting the flower-stalks therein and to clamp the same elastically when the leaves are secured by the fastener. The leaves $a$ and $b$ are made in one piece and connected by an open loop $c$ at one end. The fastener at the opposite end is formed by a coil $d$ upon the leaf $a$ with a hole $e$ at its outer side, and an ear $f$ bent upon the end of the opposite leaf $b$ and provided with an internal pin $g$ to enter the hole $e$. The two leaves are readily made in one piece from a strip of hard rolled metal, and the ear $f$ when bent therefrom is also elastic, and the coil $d$ forms a rounded end upon the leaf $a$ over which the end of the pin $g$ slips when closing the leaves together, until the locking-pin $g$ enters the hole $e$, when the elasticity of the ear and of the leaves retains the pin in the hole. The pin and hole thus form a secure fastener for the flower-holder.

Pins $b'$ are shown projected from the inner side of the leaf $b$ to prevent the stalks of the flowers from slipping out of the holder, and such pins may be applied to both of the leaves if desired; but experience shows that pins upon one leaf are sufficient. The elasticity of the leaves permits them to bend away from one another when flower-stalks $h$ are inserted between the same before engaging the fastener, and the holder is thus adapted, as shown in Fig. 2, to accommodate itself to the bulk of the stalks which are inserted between the leaves. The expansive pressure of the stalks within the leaves tends to draw the locking-pin $g$ more tightly in the hole $e$ and the fastener is thus held by the pressure of the flower-stalks. A tongue $i$ is jointed to one end of the leaf $a$ by hinge $j$ upon its outer side, and the usual guard $k$ is fixed upon the outer end of the same leaf to engage the point of the tongue, as shown in Fig. 2. The tongue thus serves to hold a bunch of flowers upon any part of the dress to which it is applied, and which is represented by the line $l$. The formation of the leaves in one piece with the open loop $c$ at one end, confers a great amount of elasticity upon the members of the holder, and the construction of the fastener is such that the expansion of the holder, by insertion of flowers therein, does not diminish but rather increases the efficiency of the fastener. The hinged tongue $i$ serves to fasten the flower-holder readily upon the dress, and the whole device thus furnishes a convenient means of supporting flowers on any part of the dress.

Having thus set forth the nature of the invention what is claimed herein is:

In a flower-holder, the combination, with two elastic leaves, $a$ and $b$, made in one piece, with a loop $c$ at one end, of a coil $d$ upon the end of one of the leaves with a hole $e$ in its outer side, and an ear $f$ upon the end of the opposite leaf with a pin $g$ to engage the said hole, pins projected within at least one of the leaves to hold the flower-stalks therein, and means for attaching the holder to the dress of the wearer.

In testimony whereof I have hereunto set my hand in the presence of two subscribing witnesses.

ACHILL BIPPART.

Witnesses:
L. LEE,
THOMAS S. CRANE.